US010175814B2

(12) United States Patent
Fukutome

(10) Patent No.: US 10,175,814 B2
(45) Date of Patent: Jan. 8, 2019

(54) TOUCH PANEL, COMMAND-INPUT METHOD OF TOUCH PANEL, AND DISPLAY SYSTEM

(71) Applicant: Semiconductor Energy Laboratory Co., Ltd., Kanagawa-ken (JP)

(72) Inventor: Takahiro Fukutome, Tochigi (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 90 days.

(21) Appl. No.: 15/370,183

(22) Filed: Dec. 6, 2016

(65) Prior Publication Data
US 2017/0160865 A1 Jun. 8, 2017

(30) Foreign Application Priority Data

Dec. 8, 2015 (JP) .................................. 2015-239258
Jan. 22, 2016 (JP) .................................. 2016-010297

(51) Int. Cl.
*G06F 3/00* (2006.01)
*G06F 3/041* (2006.01)
G06F 1/16 (2006.01)
G06F 3/044 (2006.01)

(52) U.S. Cl.
CPC ........... *G06F 3/0416* (2013.01); *G06F 1/163* (2013.01); *G06F 3/041* (2013.01); *G06F 3/044* (2013.01)

(58) Field of Classification Search
CPC ........ G06F 3/041; G06F 3/044; G06F 3/0416; G06F 1/163
See application file for complete search history.

(56) References Cited

U.S. PATENT DOCUMENTS

| 7,932,893 | B1 * | 4/2011 | Berthaud | ............... | G04G 21/00 |
| | | | | | 178/18.06 |
| 2006/0077182 | A1 | 4/2006 | Studt | | |
| 2006/0092177 | A1 | 5/2006 | Blasko | | |
| 2007/0291013 | A1 | 12/2007 | Won | | |

(Continued)

FOREIGN PATENT DOCUMENTS

| CN | 001766824 A | 5/2006 |
| JP | 2004-362429 A | 12/2004 |

(Continued)

OTHER PUBLICATIONS

International Search Report re Application No. PCT/IB2016/057114, dated Feb. 28, 2017.

(Continued)

*Primary Examiner* — Muhammad N Edun
(74) *Attorney, Agent, or Firm* — Husch Blackwell LLP

(57) ABSTRACT

Provided is a touch panel capable of operating without dependence on visual observation, or a command-input method thereof. Provided is a touch panel with low power consumption, or a command-input method thereof. A command-input method of a touch panel including a first touch sensor and a second touch sensor includes a first step of sensing an object by the first touch sensor, a second step of starting operation for enabling operation of the second touch sensor, a third step of sensing the object by the second touch sensor, a fourth step of executing a first command by the touch panel, and a fifth step of starting operation for disabling the operation of the second touch sensor.

12 Claims, 15 Drawing Sheets

(56) References Cited

U.S. PATENT DOCUMENTS

| | | | |
|---|---|---|---|
| 2011/0043473 A1 | 2/2011 | Kozuma | |
| 2011/0205209 A1 | 8/2011 | Kurokawa et al. | |
| 2011/0291013 A1 | 12/2011 | Kurokawa et al. | |
| 2012/0001847 A1 | 1/2012 | Kozuma et al. | |
| 2012/0085890 A1 | 4/2012 | Kurokawa | |
| 2012/0274654 A1 | 11/2012 | Hirakata | |
| 2013/0257798 A1 | 10/2013 | Tamura et al. | |
| 2014/0085277 A1 | 3/2014 | Iwaki | |
| 2015/0103023 A1 | 4/2015 | Iwaki | |
| 2015/0316958 A1 | 11/2015 | Takesue | |
| 2016/0071446 A1 | 3/2016 | Miyake | |
| 2016/0071447 A1 | 3/2016 | Takemura et al. | |
| 2016/0117020 A1 | 4/2016 | Takemura | |
| 2016/0260396 A1 | 9/2016 | Miyake et al. | |
| 2016/0378291 A1* | 12/2016 | Pokrzywka | G06F 3/0488 715/751 |
| 2017/0177213 A1* | 6/2017 | Yim | G06F 3/04886 |

FOREIGN PATENT DOCUMENTS

| | | |
|---|---|---|
| JP | 2011-013996 A | 1/2011 |
| JP | 2013-047968 A | 3/2013 |
| JP | 2014-049061 A | 3/2014 |
| WO | WO 2013/099070 A1 | 7/2013 |

OTHER PUBLICATIONS

Written Opinion re Application No. PCT/IB2016/057114, dated Feb. 28, 2017.

\* cited by examiner

# TOUCH PANEL, COMMAND-INPUT METHOD OF TOUCH PANEL, AND DISPLAY SYSTEM

TECHNICAL FIELD

One embodiment of the present invention relates to a touch panel. Alternatively, one embodiment of the present invention relates to a command-input method of the touch panel.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

In this specification and the like, a touch panel refers to a display device (or a display module) provided with a touch sensor. In some cases, a touch panel is called a touch screen. Furthermore, a device which does not include a display device and includes only a touch sensor is called a touch panel in some cases. A display device that is provided with a touch sensor is also called a touch sensor equipped display device, a display device equipped touch panel, a display module, or the like in some cases.

BACKGROUND ART

Smart phones are typical examples of a product having a touch panel including a display device and a touch sensor. The touch sensor is formed to overlap with the display device, or incorporated in a pixel.

A touch sensor is arranged to overlap with sections which divide a screen of a display device into a plurality of pieces. By touching a position corresponding to the position of an icon displayed on the display device, a user inputs a command. Because a smart phone performs complicated processing, a user is supposed to have a smart phone always in his/her hand and operate it while viewing an image during its use. Accordingly, a touch panel needs to have a constant resolution.

Meanwhile, a command-input device which allows a user to operate without visual observation, such as an information guide terminal (a car navigation) to which a command is input in accordance with the number of touches is proposed (Patent Document 1).

REFERENCE

Patent Document

[Patent Document 1] Japanese Published Patent Application No. 2004-362429

DISCLOSURE OF INVENTION

Owing to the progress of mobile devices, wearable terminals such as smart watches have been actively developed. For the wearable terminals, reduction in size, reduction in weight, and simplification of an input interface are required. Furthermore, wearable terminals which monitor a vital sign such as blood pressure, pulse, or the like have been commercialized.

Users often use such wearable terminals while performing an exercise such as running, cycling, or the like. An input interface which does not depend on visual observation, which is easily operated, and which hardly causes erroneous operation, is desired so that a user can use the terminal while moving.

One embodiment of the present invention is to provide a touch panel capable of operating without dependence on visual observation or a command-input method of the touch panel. Furthermore, one embodiment of the present invention is to provide a touch panel that hardly causes erroneous operation or a command-input method of the touch panel. Furthermore, one embodiment of the present invention is to provide a touch panel with low power consumption or a command-input method of the touch panel. Furthermore, one embodiment of the present invention is to provide a novel touch panel or a command-input method of the touch panel.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a command-input method of a touch panel including a first touch sensor and a second touch sensor. The method includes the following steps: a first step of sensing an object by the first touch sensor; a second step of starting operation for enabling operation of the second touch sensor; a third step of sensing the object by the second touch sensor; a fourth step of executing a first command when the object is sensed in the third step; a fifth step of starting operation for disabling the operation of the second touch sensor; and a sixth step of proceeding to the fifth step when the object is not sensed in the third step. In the second step, the operation for enabling the operation of the second touch sensor starts when the object is sensed by the first touch sensor. A first time interval is provided between the second step and the third step. The first time interval is provided between the second step and the fifth step. The first time interval is provided between the second step and the sixth step. The first time interval is greater than or equal to 0.05 seconds and less than or equal to 0.5 seconds.

Another embodiment of the present invention is a touch panel including a first touch sensor and a second touch sensor. The first touch sensor and the second touch sensor are spaced from each other. The first touch sensor and the second touch sensor are provided on the same plane.

According to another embodiment of the present invention, in the above touch panel, the first touch sensor has a region overlapping with the display portion, and the second touch sensor has a region overlapping with the display portion.

According to another embodiment of the present invention, in the above touch panel, the display portion includes a display element, and the display element is an EL element, a liquid crystal element, or an electrophoretic element.

According to another embodiment of the present invention, the above touch panel further includes a driver IC. The driver IC includes a scan line driver circuit controller and a sensing circuit. The display portion includes a scan line driver circuit. The scan line driver circuit controller is configured to output a clock signal to the sensing circuit and the scan line driver circuit.

Another embodiment of the present invention is a display system including an electronic device and an arithmetic unit. The electronic device includes a display portion, a first touch sensor, a second touch sensor, and a communication portion. The first touch sensor and the second touch sensor are spaced from each other. The first touch sensor and the second touch sensor are provided on the same plane. The first touch sensor and the second touch sensor are configured to sense a command. The communication portion is configured to transmit first data in response to the command to the arithmetic unit. The arithmetic unit is configured to output second data in response to the first data. The arithmetic unit is configured to transmit the second data to the communication portion. The display portion is configured to perform display in response to the second data.

According to another embodiment of the present invention, the communication portion is configured to communicate with the arithmetic unit wirelessly.

Another embodiment of the present invention is a display system including an electronic device, a first arithmetic unit, and a second arithmetic unit. The electronic device includes a display portion, a first touch sensor, a second touch sensor, and a communication portion. The first touch sensor and the second touch sensor are spaced from each other. The first touch sensor and the second touch sensor are provided on the same plane. The first touch sensor and the second touch sensor are configured to sense a command. The communication portion is configured to transmit first data in response to the command to the first arithmetic unit. The first arithmetic unit is configured to transmit the first data to the second arithmetic unit via a network. The second arithmetic unit is configured to output second data in response to the first data. The second arithmetic unit is configured to transmit the second data to the first arithmetic unit via the network. The first arithmetic unit is configured to transmit the second data to the communication portion. The display portion is configured to perform display in response to the second data.

According to another embodiment of the present invention, the communication portion is configured to communicate with the first arithmetic unit wirelessly.

According to one embodiment of the present invention, a touch panel capable of operating without dependence on visual observation or a command-input method of the touch panel can be provided. Furthermore, according to one embodiment of the present invention, a touch panel that hardly causes erroneous operation or a command-input method of the touch panel can be provided. Furthermore, according to one embodiment of the present invention, a touch panel with low power consumption or a command-input method of the touch panel can be provided. Furthermore, according to one embodiment of the present invention, a novel touch panel, or a command-input method of the touch panel can be provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

BEST MODE FOR CARRYING OUT THE INVENTION

Figure 1A:
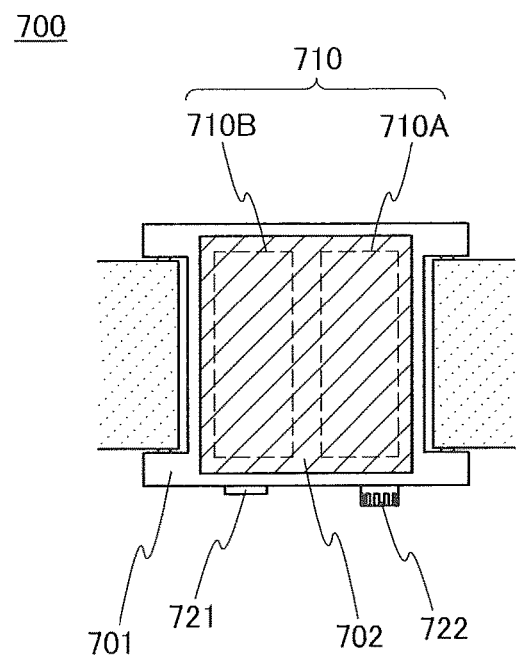
FIGS. 1A and 1B are a top view and a perspective view illustrating the structure of a touch panel of one embodiment.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments and example. Note that in structures of the present invention described below, the same portions or portions having similar functions are denoted by the same reference numerals in different drawings, and a description thereof is not repeated.

Embodiment 1

In this embodiment, a touch panel and a command-input method thereof which are embodiments of the present invention are described with reference to FIGS. 1A and 1B, FIGS. 2A and 2B, FIG. 3, FIG. 4, FIG. 5, FIGS. 6A and 6B, FIG. 7, FIG. 8, FIG. 9, FIG. 10, FIGS. 11A and 11B, and FIG. 12.

<Structural Example 1 of Touch Panel>

Figure 1B:
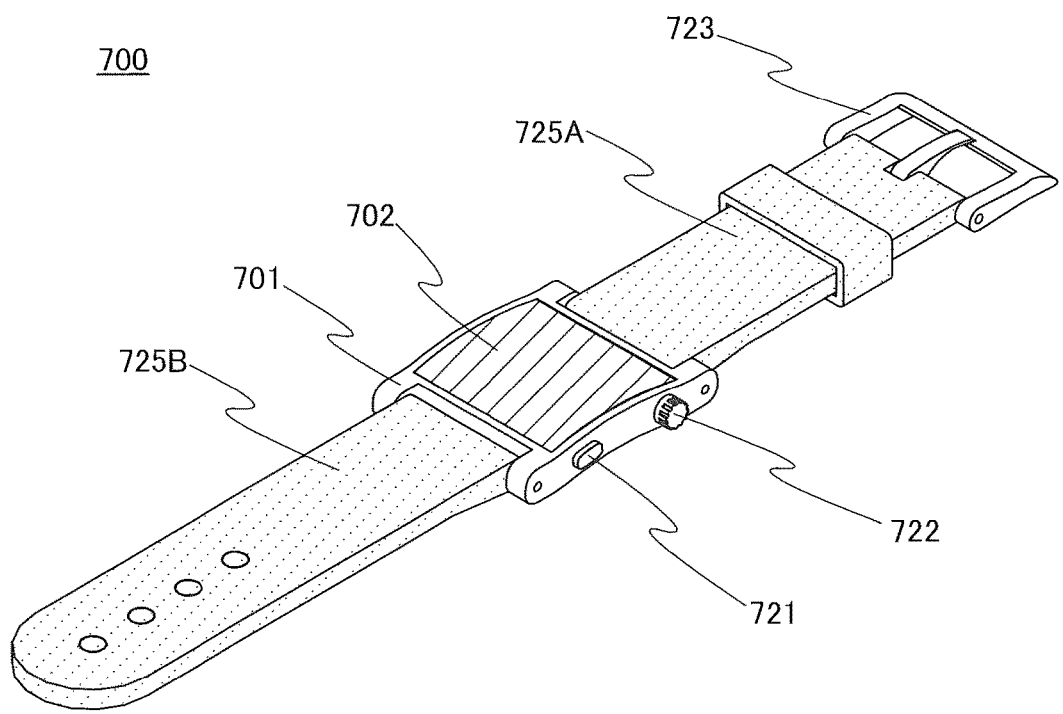
Figure 2A:
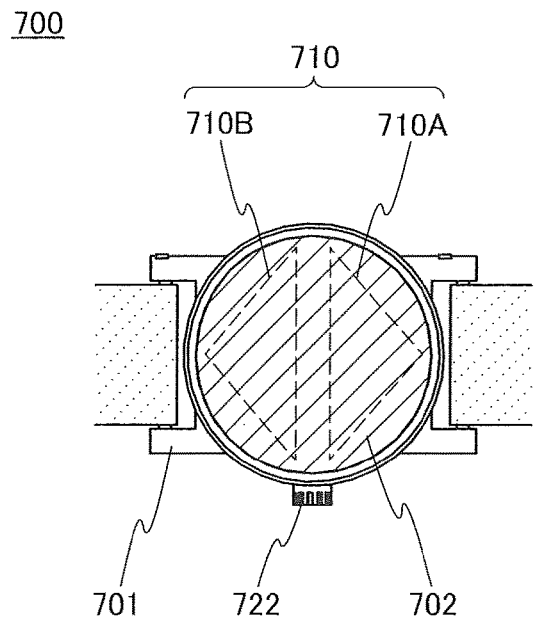
FIGS. 2A and 2B are a top view and a perspective view illustrating the structure of a touch panel of one embodiment.
Figure 2B:
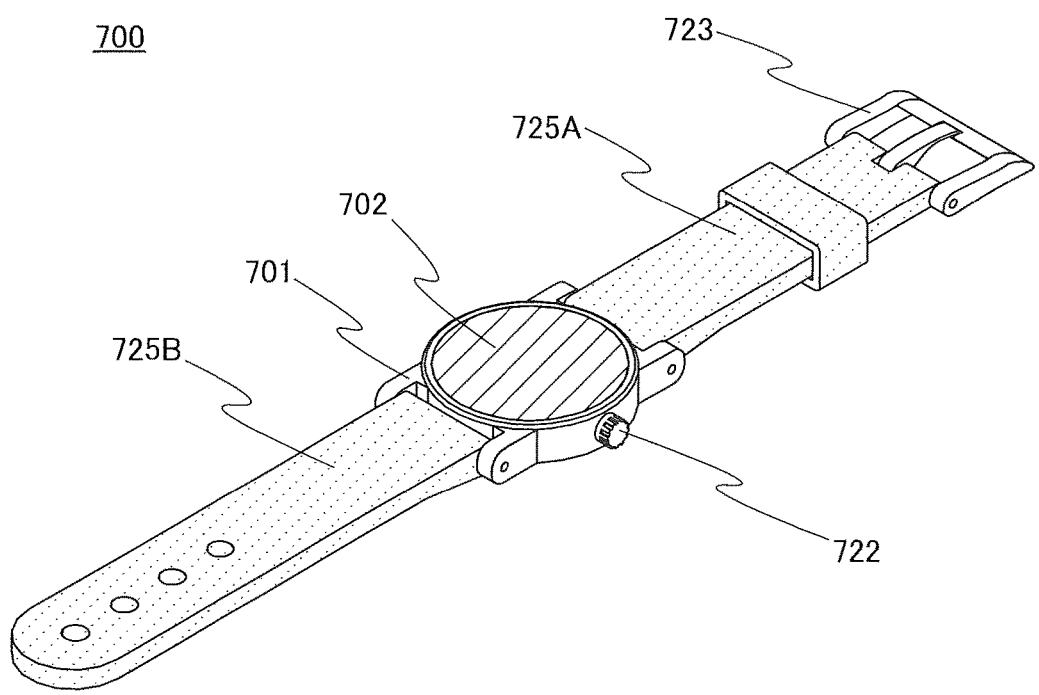

FIG. 1A shows a top view including main components of a watch-type touch panel 700. FIG. 1B shows a perspective view of the touch panel 700. The touch panel 700 includes a housing 701, a display panel, and touch sensors 710A and 710B. The display panel includes a display portion 702. Although FIG. 1A illustrates an example in which the touch panel 700 includes operation buttons 721 and 722, the touch panel does not necessarily include the operation buttons 721 and 722.

The touch sensors 710A and 710B (hereinafter, collectively referred to as a touch sensor 710) are formed on the same plane and spaced from each other. The touch sensor 710 may be provided over the display panel or incorporated into the display panel.

Although FIG. 1A shows an example in which the touch sensors 710A and 710B have the same size, one embodiment of the present invention is not limited to this. The touch sensor 710A may be larger than or smaller than the touch sensor 710B.

In the touch panel 700, a command input can be performed by sensing of an object by the touch sensor 710. Specifically, a command input can be performed by sensing of an object by the touch sensor 710B within a predetermined time after the object is sensed by the touch sensor 710A, for example. Alternatively, a command input can be performed by sensing of an object by the touch sensor 710A within a predetermined time after the object is sensed by the touch sensor 710B. Examples of processing executed by the command input include a change of a display content of the display portion 702, a change of a display mode of the display portion 702, and operation lock, unlock, and power-off of the touch panel 700.

A command input is performed by continuous sensing of an object by a plurality of touch sensors, so that chattering due to external noise and unclear touch can be prevented. Furthermore, the touch sensors 710A and 710B are spaced from each other, so that erroneous operation, such as sensing of an object by a plurality of touch sensors at a time, can be prevented.

The touch panel 700 can be driven by placing one sensor element in each region of the touch sensors 710A and 710B. Thus, a circuit for the operation of the touch sensor 710 can be simplified.

Furthermore, it is preferable that the touch sensor 710 have a region overlapping with the display portion 702. Specifically, it is preferable that the touch sensor 710 be positioned inside a perimeter of the display portion 702 in the top view. With such a structure, the area of the display portion 702 in the touch panel 700 can be large.

A variety of sensors that can sense the approach or contact of an object, such as a finger, can be used as the touch sensor 710. For example, as the touch sensor 710, a capacitive touch sensor, an optical sensor using a photoelectric conversion element, a pressure-sensitive sensor using a pressure-sensitive element, or the like can be used.

Note that the touch panel 700 may have a function of performing a command input by sensing of an object by the touch sensor 710A or 710B. Alternatively, the touch panel 700 may have a function of performing a command input by a user's press on an operation button 721 or rotation of a dial operation button 722. For example, the operation button 721 has a function of turning on and off the touch panel 700.

The display panel mounted in the housing 701 serving as a bezel includes the rectangular display portion 702. Although the display portion 702 in FIG. 1B has a curved surface, it may be flat. The display panel provided with the display portion 702 preferably has flexibility. Note that a display region may have a non-rectangular shape, for example, a circular shape (see FIGS. 2A and 2B). The display portion 702 includes a plurality of pixels, and each pixel includes a display element. Examples of the display element include a liquid crystal element, an electro luminescence (EL) element, and an electrophoretic element.

The touch panel 700 includes bands 725A and 725B, and a clasp 723 (see FIG. 1B). The bands 725A and 725B are connected to the housing 701. The clasp 723 is connected the band 725A. The band 725A and the housing 701 are connected such that a connection part can rotate around a pin. The same applies to the connection between the band 725B and the housing 701 and the connection between the band 725A and the clasp 723.

Note that it is preferable that the touch sensor 710B be enabled when the touch sensor 710A senses an object. In a standby state in which operation of the touch panel 700 is not performed, only the touch sensor 710A is allowed to sense an object, whereby power consumption of the touch panel 700 can be reduced.

<Command-Input Method 1 of Touch Panel>

An example of a command-input method of the touch panel 700 is described with reference to FIG. 3 and FIG. 4 below. Note that, a time lag sometimes occurs after the operation for enabling or disabling the touch sensor 710 starts before the touch sensor 710 is actually enabled or disabled.

Figure 3:
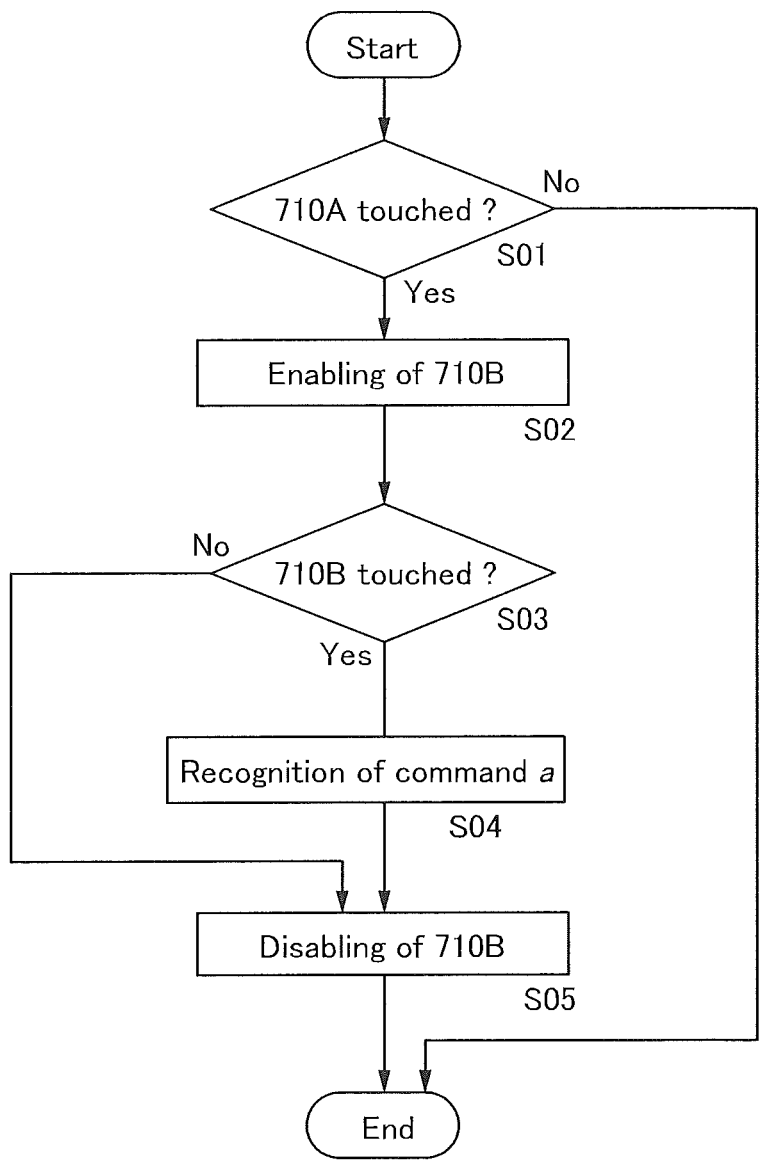
FIG. 3 is a flow chart of operation of a touch panel of one embodiment.
Figure 4:
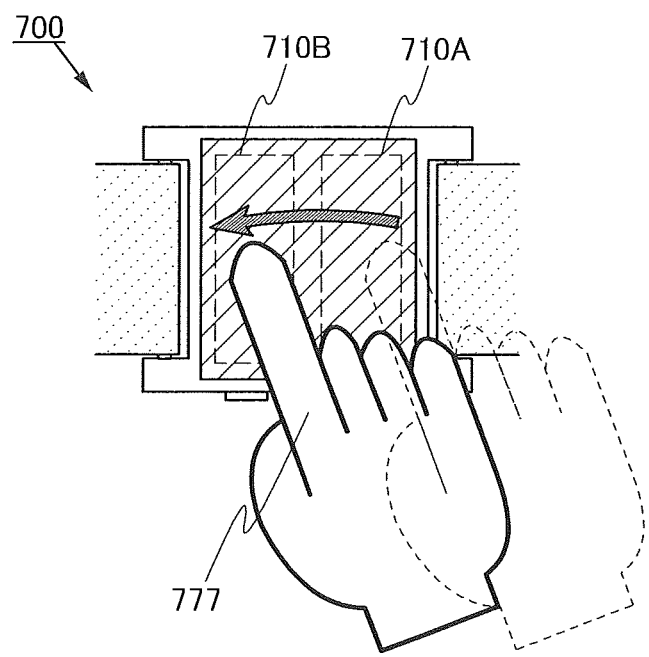
FIG. 4 is a top view illustrating operation of a touch panel of one embodiment.

FIG. 3 is a flow chart showing the steps up to a command input on the touch panel 700. The command input method of the touch panel 700 includes the following five steps.

When the touch panel 700 is in a waiting state of the command input, only the touch sensor 710A is enabled, and the touch sensor 710B is not driven. First, when the sensor 710A senses the approach or contact of an object (hereinafter referred to as "senses a touch"), operation for enabling the touch sensor 710B starts (see S01 and S02 in FIG. 3).

After that, when the touch sensor 710B senses the touch, the touch panel 700 recognizes the input of a command a and executes a process in response to the command a (see S03 and S04 in FIG. 3). Then, when the touch is not sensed by the touch sensor 710B within a time interval T1 after the touch sensor 710B is enabled or after the command a is recognized, operation for disabling the touch sensor 710B starts (see S05 in FIG. 3).

The command input to the touch panel 700 is preferably performed by flicking or swiping. Because the touch sensors 710A and 710B are spaced from each other in a large region, the command input can be surely performed without dependence on visual observation. For example, as shown in FIG. 4, flicking or swiping with a finger 777 is performed from the touch sensor 710A (a start point) to the touch sensor 710B (an end point), whereby the command a can be input. Note that in this specification and the like, "flicking" refers to a quick movement of a finger touching the touch panel; meanwhile, "swiping" refers to a slow movement of a finger touching the touch panel.

The time interval T1 can be freely set. For example, in the case where the command input is performed by flicking or swiping as shown in FIG. 4, the time interval T1 is set in accordance with a distance between the touch sensors 710A and 710B and the moving speed of the finger 777. Specifically, time interval T1 is greater than or equal to 0.05 seconds and less than or equal to 0.5 seconds.

The above processing can be assigned to the command a, as appropriate.

Figure 5:
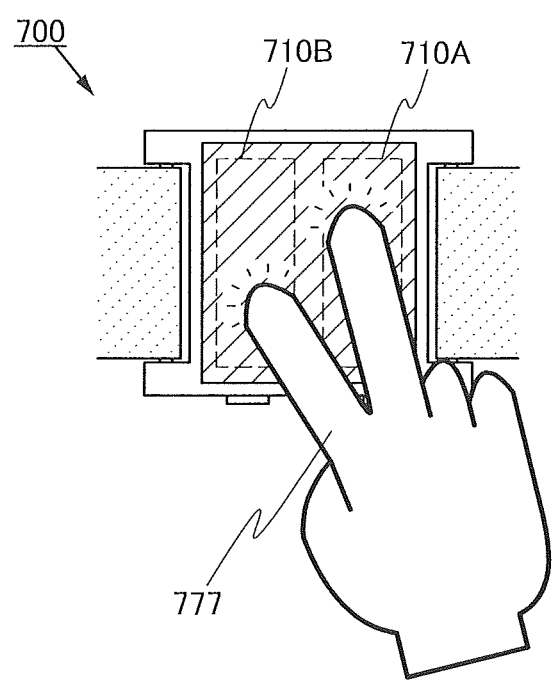
FIG. 5 is a top view illustrating operation of a touch panel of one embodiment.

As shown in FIG. 5, the command input may be performed when two fingers 777 touch the touch sensors 710A and 710B at a same time. When the touch panel 700 is in a waiting state of a command input, the touch sensor 710B is enabled in addition to the touch sensor 710A. With this manner, the command input can be surely performed.

Figure 6A:
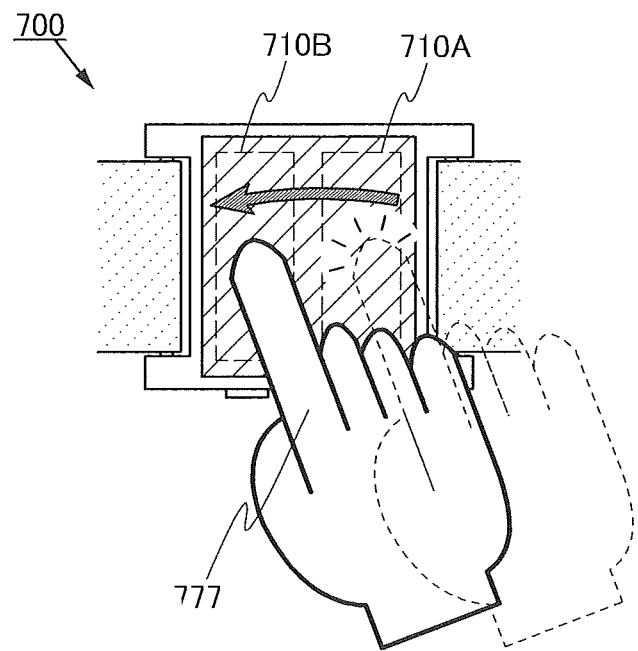
FIGS. 6A and 6B are top views illustrating operation of a touch panel of one embodiment.
Figure 6B:
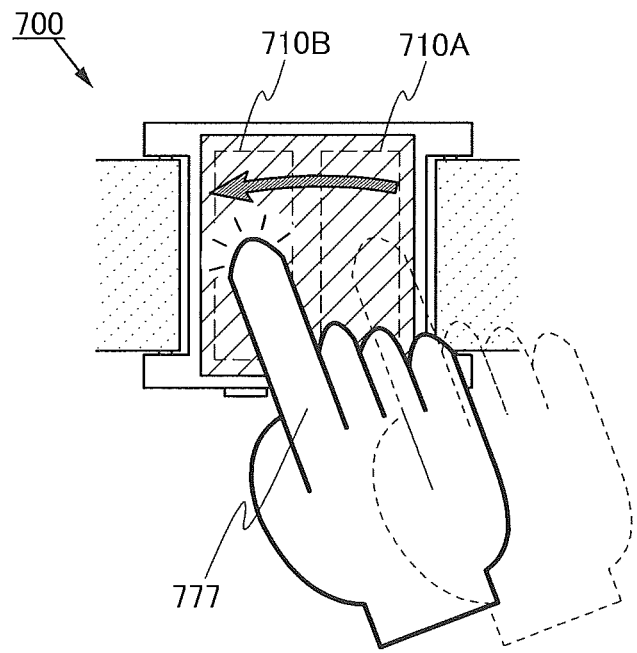

In the case of using a pressure-sensitive sensor as the touch sensor 710, a plurality of command inputs can be performed by utilizing the function of the touch sensor 710 for determining the degree of pressure applied to the touch sensor 710. For example, as shown in FIG. 6A, the touch sensor 710A is strongly pressed with the finger 777; then, flicking or swiping is performed from the touch sensor 710A (a start point) to the touch sensor 710B (an end point), whereby a command (e.g., a command b) that is different from the command a can be input. Furthermore, as shown in FIG. 6B, flicking or swiping is performed from the touch sensor 710A (a start point) to the touch sensor 710B (an end point), and the touch sensor 710B is successively pressed strongly with the finger 777, whereby a command (e.g., a command c) that is different from the command a can be input.

The above processing can be assigned to the command b and the command c, as appropriate.

<Circuit Configuration Example of Touch Panel>

In the touch panel 700 of one embodiment of the present invention, the configuration of the circuit related to the operation of the touch sensor 710 can be simplified. For example, the operation of the touch sensor 710 can be controlled by a driver IC that generates a signal related to data displayed on the display portion 702 and a control circuit that controls the driver IC. Because a control circuit that mainly controls the touch panel is not necessarily provided in the touch panel 700, the number of components included in the touch panel 700 can be reduced.

Figure 7:
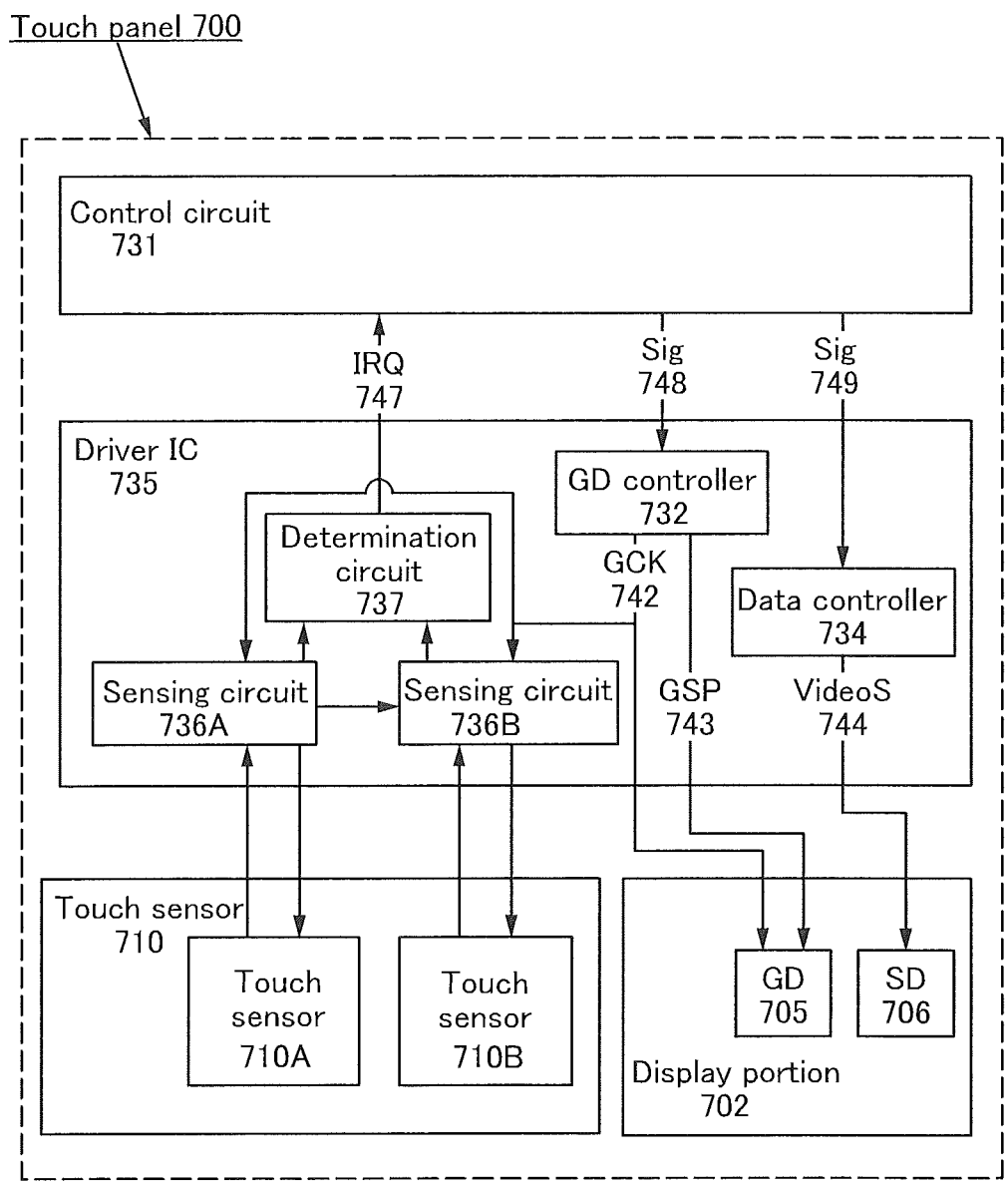
FIG. 7 is a block diagram illustrating the structure of a touch panel of one embodiment.

An example of a circuit configuration of the touch panel 700 is described with reference to FIG. 7 below. In FIG. 7, the directions of arrows represent the directions of signal transmission.

The touch panel 700 includes a control circuit 731, a driver IC 735, the touch sensor 710, and the display portion 702. The driver IC 735 includes a scan line driver circuit (GD) controller 732, a data controller 734, sensing circuits 736A and 736B, and a determination circuit 737. The touch sensor 710 includes touch sensors 710A and 710B. The display portion 702 includes a scan line driver circuit (GD) controller 705 and a signal line driver circuit (SD) 706.

The control circuit 731 has a function of controlling operation of the driver IC 735. Specifically, predetermined signals Sig 748 and Sig 749 are output to the GD controller 732 and the data controller 734, respectively. Furthermore, when receiving an interrupt request signal (IRQ 747) output from the determination circuit 737, the control circuit 731 has a function of executing a command in response to the interrupt request signal.

The GD controller 732 generates a GCK 742 and a GSP 743 in response to the Sig 748. The GCK 742 is a clock signal and is output to the GD 705 and the sensing circuits 736A and 736B. The GSP 743 is a start pulse signal and is output to the GD 705. The data controller 734 generates a Video S744 in accordance with the Sig 749. The Video S744 is an image signal and is output to the SD 706.

The sensing circuits 736A and 736B have functions of controlling touch sensing of the touch sensors 710A and 710B, respectively. Specifically, on the basis of the GCK 742 input from the GD controller 732, the sensing circuits 736A and 736B generate signals for making the touch sensors 710A and 710B to sense a touch and output the signals to the touch sensors 710A and 710B. Furthermore, when sensing touches on the touch sensors 710A and 710B, the sensing circuits 736A and 736B output signals indicating the touch sensing to the determination circuit 737.

The determination circuit 737 has a function of determining a combination of touch sensing of the touch sensors 710A and 710B. Specifically, the determination circuit 737 outputs to the control circuit 731 an interrupt request signal based on the signals indicating the touch sensing input from the sensing circuits 736A and 736B. Specifically, the signal input from the sensing circuit 736A is held in a predetermined time, and when the signal is input from the sensing circuit 736B in the predetermined time, the IRQ 747 is output to the control circuit 731.

Figure 8:
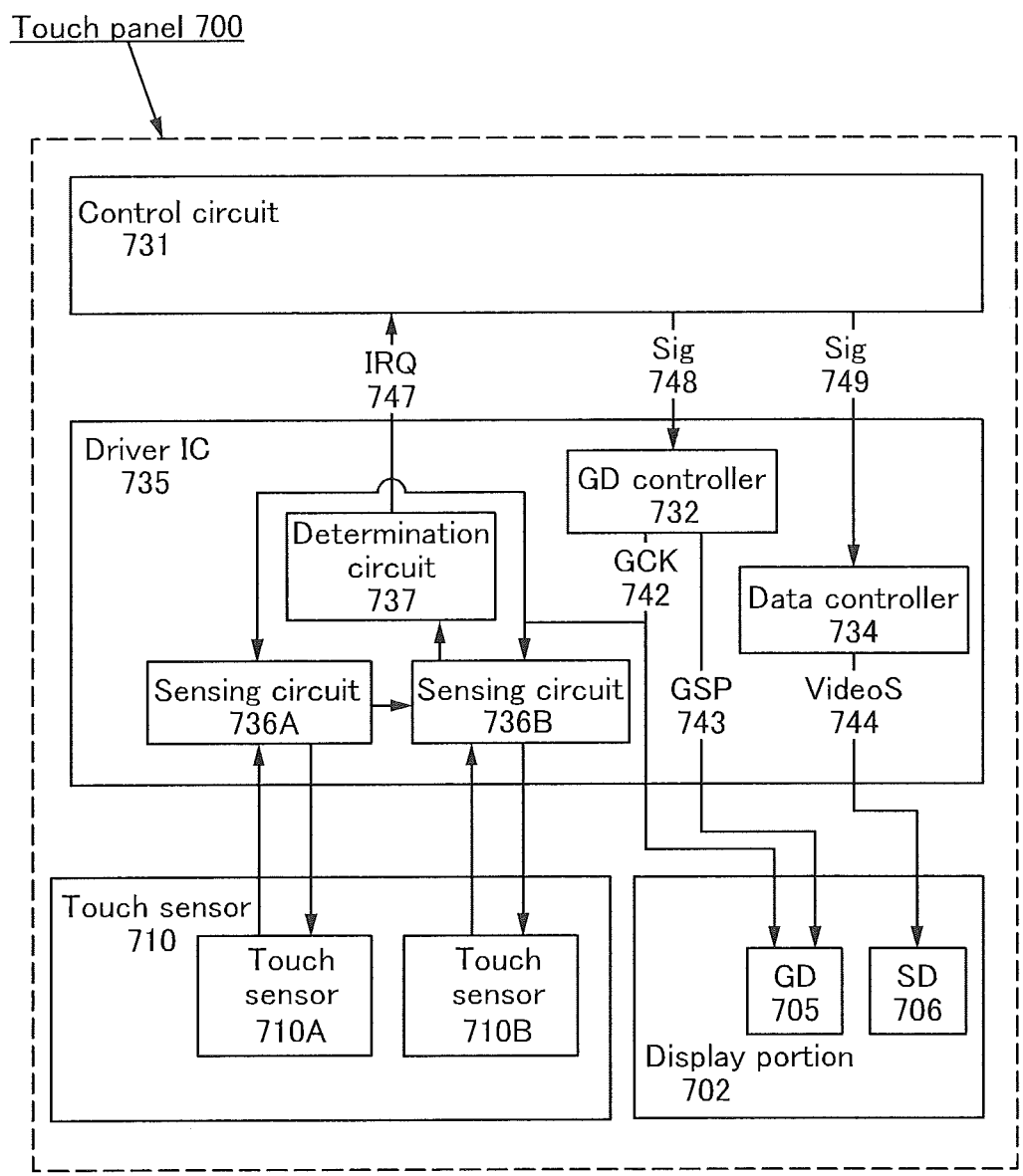
FIG. 8 is a block diagram illustrating the structure of a touch panel of one embodiment.

In the case where the sensing circuit 736A senses a touch on the touch sensor 710A, the signal indicating the touch sensing is not necessarily output to the determination circuit 737 (see FIG. 8). In the configuration shown in FIG. 8, when the signal indicating the touch sensing is input from the sensing circuit 736B, the determination circuit 737 outputs the IRQ 747 to the control circuit 731.

Because the touch panel of one embodiment of the present invention can perform the touch sensing using a signal, such as the GCK 742, for performing display of the display portion, a control circuit that mainly controls the touch panel is not necessarily provided. Thus, the number of components included in the touch panel can be reduced.

It is preferable that, in the touch panel 700, sensing of a touch on the touch sensor 710 be performed in a period during which display of the display portion 702 is not performed. This is because the following phenomenon can be prevented: the signal related to touch sensing fluctuates due to parasitic capacitance between wirings or the like and has an influence on the display of the display portion 702 which has a region overlapping with the touch sensor 710. Thus, one frame period (1/60 seconds in the case where frame frequency is 60 Hz) in the driving of the touch panel 700 includes a display period and a touch sensing period.

In the display period, gate selection lines select pixels in a predetermined order based on the GCK 742, and a gradation signal output from the SD 706 based on the Video S744 is input to selected pixels, whereby display is performed on the display portion 702. In the touch sensing period, all the gate selection lines are in a non-selected state; thus, the GCK 742 in the touch sensing period can be used for driving of the sensing circuits 736A and 736B.

Furthermore, the sensing circuit 736A enables the operation of the sensing circuit 736B at a predetermined time when sensing the touch on the touch sensor 710A. Such a function of the sensing circuit 736A enables driving of only the sensing circuit 736A in a standby period in which a touch is not sensed on the touch panel 700, resulting in a reduction in power consumption.

<Structure Example 2 of Touch Panel>

A touch panel 750 that has a structure different from the above touch panel 700 is described below. For the common portions to the touch panel 700, the description of the touch panel 700 can be referred to.

Figure 9:
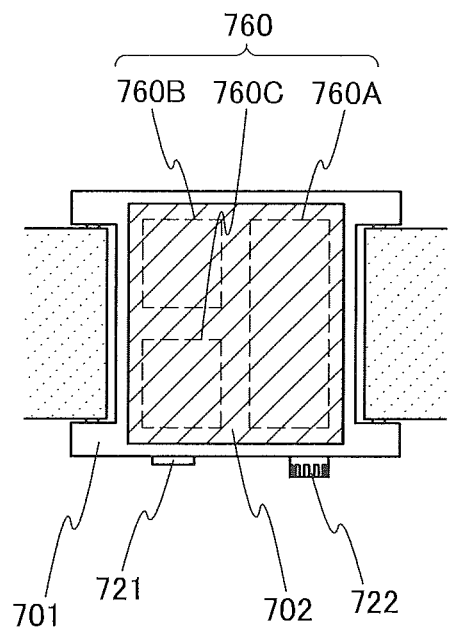
FIG. 9 is a top view illustrating the structure of a touch panel of one embodiment.

FIG. 9 shows a top view including main components of the watch-type touch panel 750. The touch panel 750 includes a housing 701, a display panel, and touch sensors 760A, 760B, and 760C. The display panel includes a display portion 702. The touch panel 750 includes three touch sensors, which is different from the touch panel 700. A perspective view of the touch panel 750 is similar to that of the touch panel 700 in FIG. 1B.

The touch sensors 760A, 760B, and 760C (hereinafter, collectively referred to as a touch sensor 760) are formed on the same plane and spaced from each others. Although FIG. 9 shows an example in which the touch sensor 760A is the largest, and the touch sensors 760B and 760C have the same size, one embodiment of the present invention is not limited thereto. The touch sensors 760A, 760B, and 760C may have the same size or have different sizes.

In the touch panel 750, a command input can be performed by sensing of an object by the touch sensor 760. Specifically, for example, the command input can be performed by sensing of an object by the touch sensor 760B or 760C within a predetermined time after the object is sensed by the touch sensor 760A.

A command input is performed by continuous sensing of an object by a plurality of touch sensors, so that chattering due to external noise and unclear touch can be prevented. Furthermore, the touch sensors 760A, 760B, and 760C are spaced from each others, so that erroneous operation, such as sensing of an object by a plurality of touch sensors at a time, can be prevented. Moreover, since the touch panel 750 includes three touch sensors, a plurality of command inputs can be performed easily and surely.

The touch panel 750 can be driven by placing one sensor element in each region of the touch sensors 760A, 760B, and 760C; thus, the configuration of the circuit related to operation of the touch sensor 760 can be simplified.

The touch panel 750 may have a function of performing a command input by sensing of an object by the touch sensor 760A, 760B, or 760C.

It is preferable that the touch sensors 760B and 760C be enabled when the touch sensor 760A senses an object. In a standby state in which operation of the touch panel 750 is not performed, only the touch sensor 760A is allowed to sense an object, whereby power consumption of the touch panel 750 can be reduced.

<Command-Input Method 2 of Touch Panel>

An example of a command-input method of the touch panel 750 is described below with reference to FIG. 10, FIGS. 11A and 11B, and FIG. 12. Note that a time lag sometimes occurs after the operation for enabling or disabling the touch sensor 760 starts before the touch sensor 760 is actually enabled or disabled.

Figure 10:
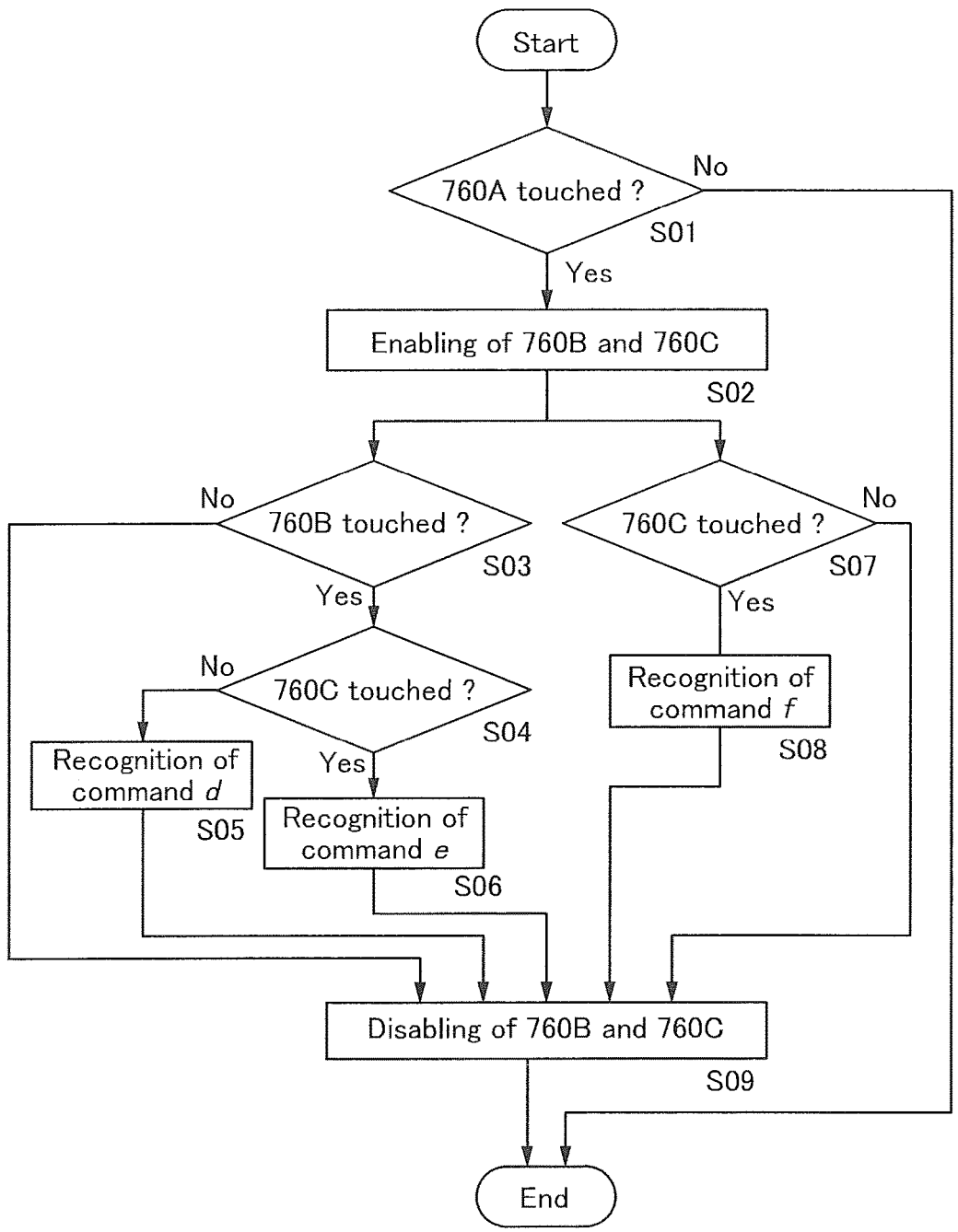
FIG. 10 is a flow chart of operation of a touch panel of one embodiment.

FIG. 10 is a flow chart showing the steps up to a command input on the touch panel 750. The command input method of the touch panel 750 includes the following nine steps.

When the touch panel 750 is in a waiting state of a command input, only the touch sensor 760A is enabled, and the touch sensors 760B and 760C are not driven. First, when the sensor 760A senses the approach or contact of an object, operation for enabling the touch sensors 760B and 760C starts (see S01 and S02 in FIG. 10).

In the case where the touch is sensed by the touch sensor 760B within a time interval T2 after the touch sensors 760B and 760C are enabled, and the touch is not sensed by the touch sensor 760C within a time interval T3 after the touch is sensed by the touch sensor 760B, the touch panel 750 recognizes an input of a command d and executes processing in response to the command d (see S03, S04, and S05 in FIG. 10). Meanwhile, in the case where the touch is sensed by the touch sensor 760C within time interval T3 after the touch is sensed by the touch sensor 760B, the touch panel 750 recognizes an input of a command e and executes processing in response to the command e (see S04 and S06 in FIG. 10).

Furthermore, in the case where the touch is sensed by the touch sensor 760C within the time interval T2 after the touch sensors 760B and 760C are enabled, the touch panel 750 recognizes an input of a command f and executes processing in response to the command f (see S07 and S08 in FIG. 10).

Then, when the touch is not sensed by the touch sensors 760B and 760C within the time interval T2 after the touch sensors 760B and 760C are enabled, or after any one of the commands d, e, and f is recognized, operation for disabling the touch sensors 760B and 760C starts (see S09 in FIG. 10).

The command input to the touch panel 750 is preferably performed by flicking or swiping. Because the touch sensors 760A, 760B, and 760C are spaced from each others in a large region, the command input can be surely performed without dependence on visual observation.

Figure 11A:
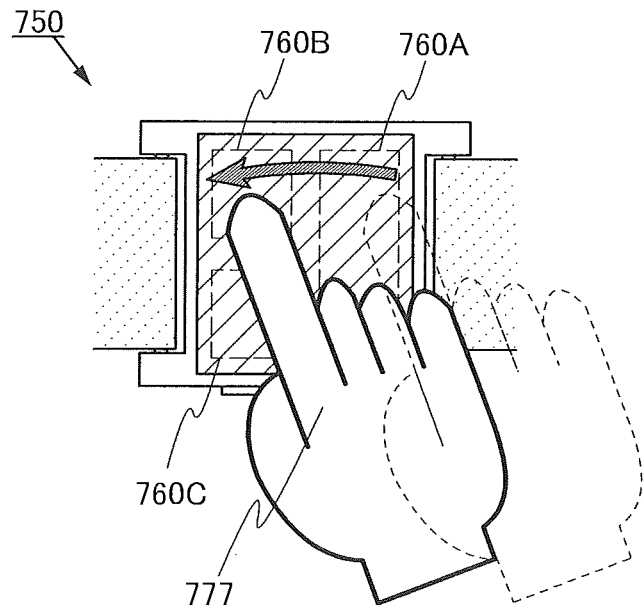
FIGS. 11A and 11B are top views illustrating operation of a touch panel of one embodiment.
Figure 11B:
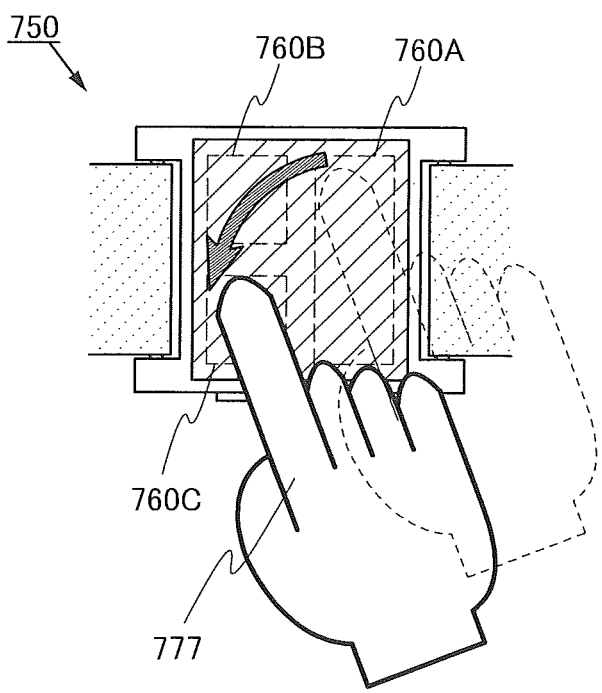
Figure 12:
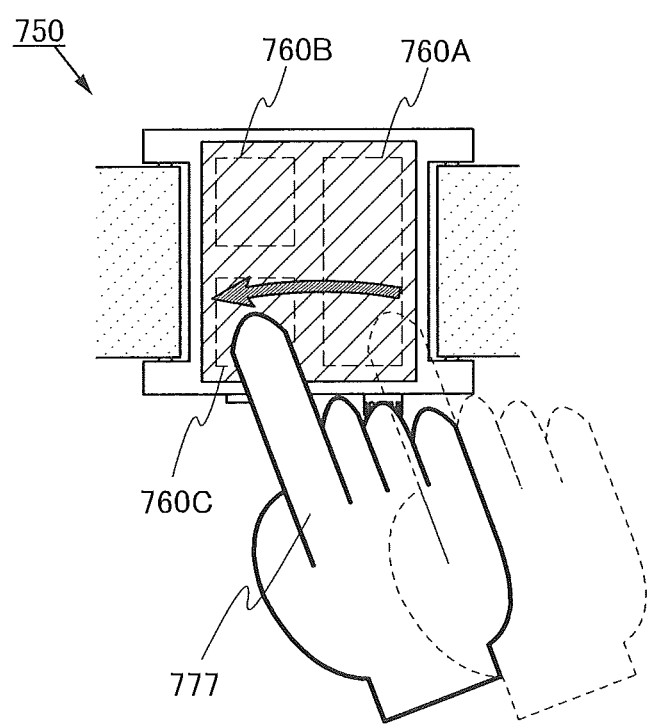
FIG. 12 is a top view illustrating operation of a touch panel of one embodiment.

For example, as shown in FIG. 11A, flicking or swiping with the finger 777 is performed from the touch sensor 760A (a start point) to the touch sensor 760B (an end point), whereby the command d can be input. Furthermore, as shown in FIG. 11B, flicking or swiping with the finger 777 is performed from the touch sensor 760A (a start point) to the touch sensor 760C (an end point) via the touch sensor 760B, whereby the command e can be input. Furthermore, as shown in FIG. 12, flicking or swiping with the finger 777 is performed from the touch sensor 760A (a start point) to the touch sensor 760C (an end point), whereby the command f can be input.

The time interval T2 can be freely set. For example, in the case where the command input is performed by flicking or swiping shown in FIG. 11A and FIG. 12, the time interval T2 is set in accordance with the distance between the touch sensors 760A and 760B, the distance between the touch sensors 760A and 760C, and the moving speed of the finger 777. Specifically, the time interval T2 is greater than or equal to 0.05 seconds and less than or equal to 0.5 seconds.

The time interval T3 can be freely set. For example, in the case where a command input is performed by flicking or swiping shown in FIG. 11B, the time interval T3 is set in accordance with the distance between the touch sensors 760B and 760C, and the moving speed of the finger 777. Specifically, the time interval T3 is greater than or equal to 0.05 seconds and less than or equal to 0.5 seconds.

The above processing can be assigned to the commands d, e, and f, as appropriate.

Embodiment 2

Figure 13:
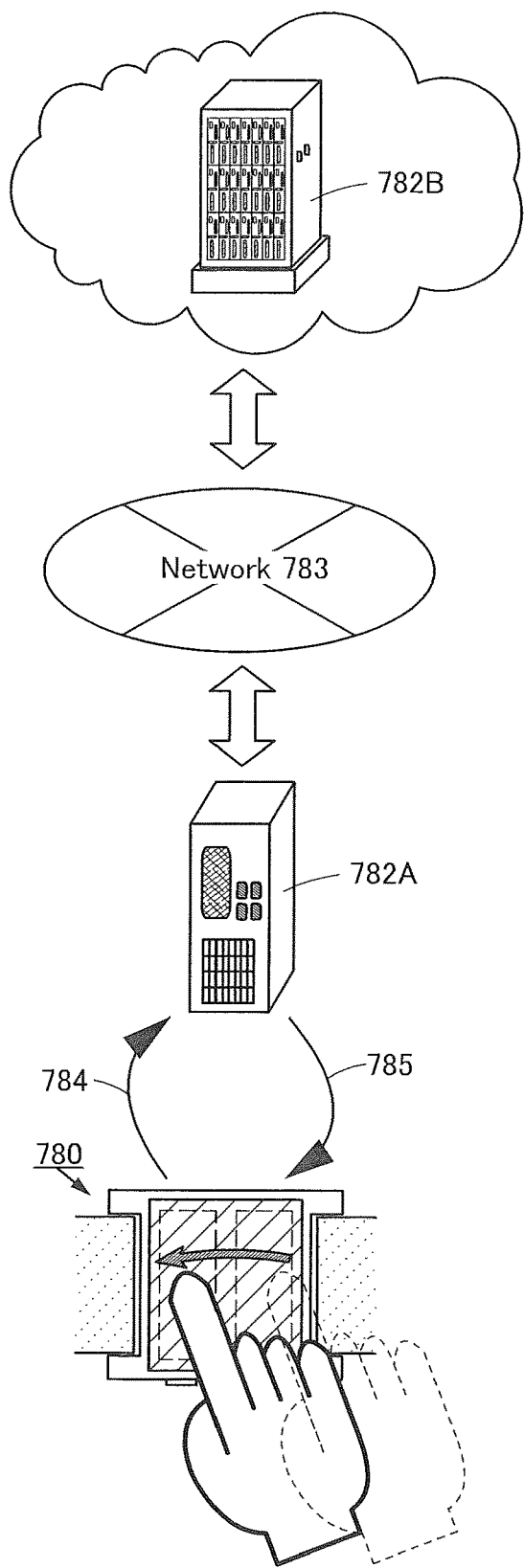
FIG. 13 is a diagram illustrating a display system using an electronic device.
Figure 14:
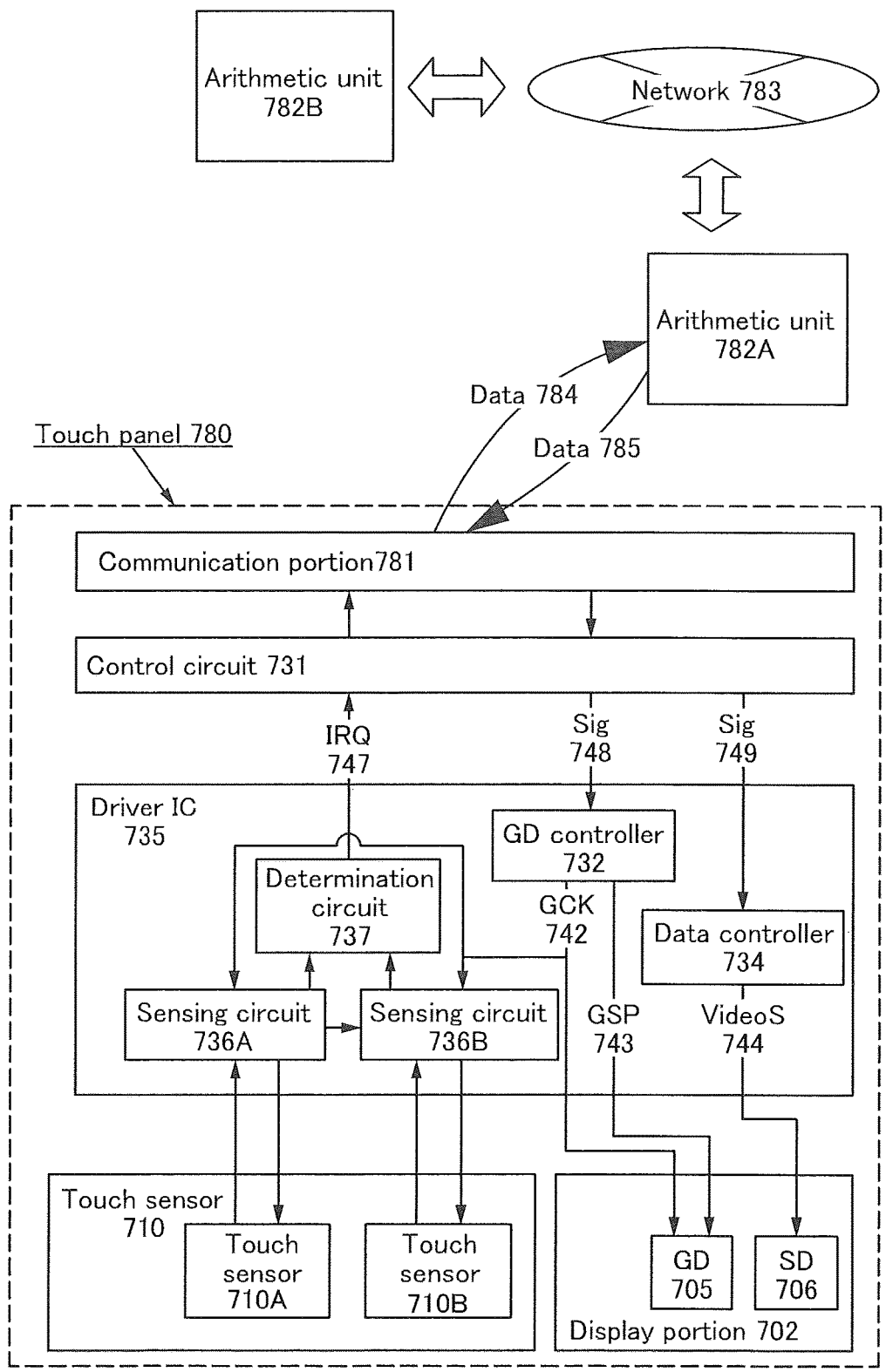
FIG. 14 is a block diagram illustrating the display system using an electronic device.
Figure 15:
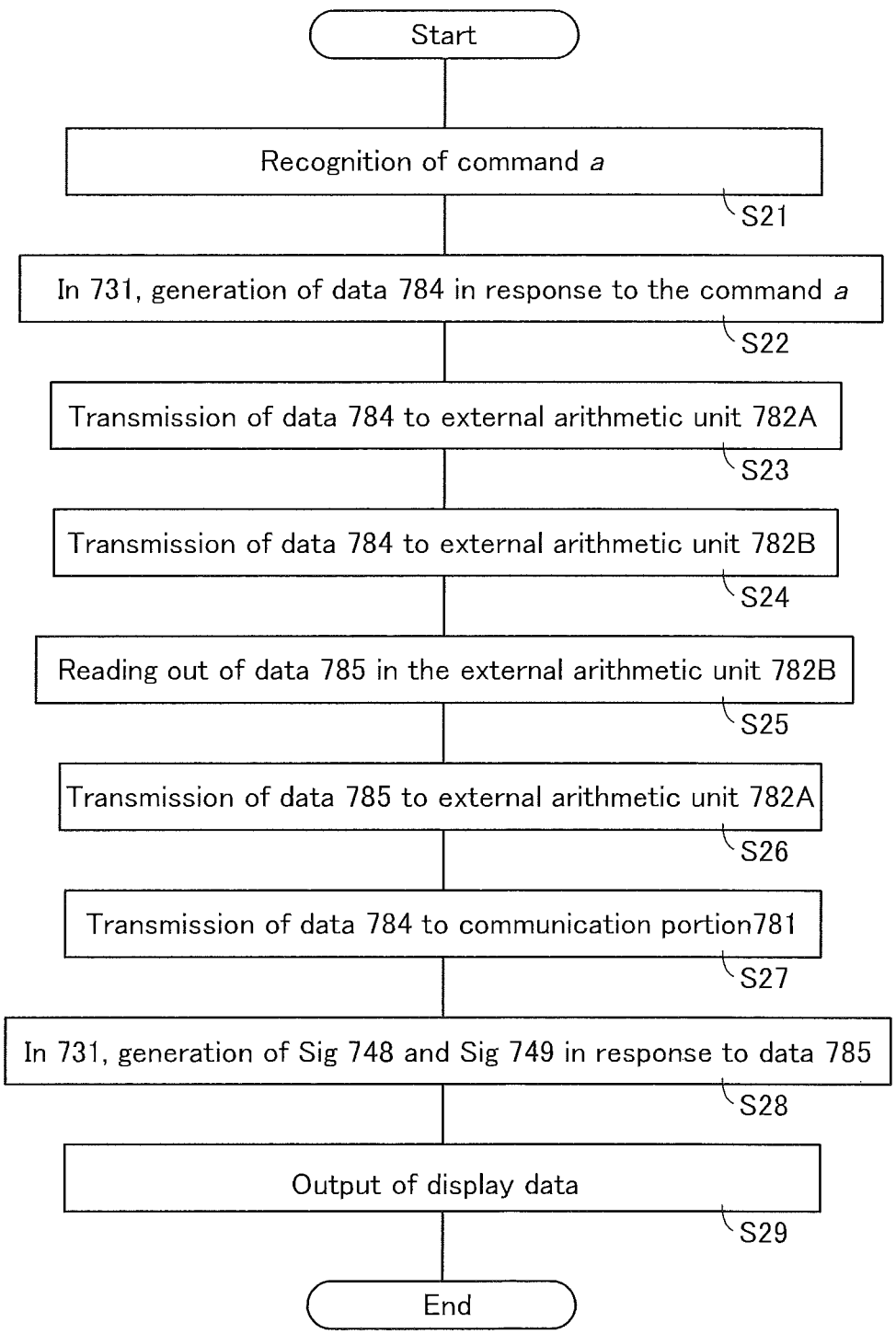
FIG. 15 is a flow chart of the display system using an electronic device.

In this embodiment, description is made of a display system of an electronic device to which the command-input method of a touch panel is applied, with reference to FIG. 13, FIG. 14, and FIG. 15.

FIG. 13 shows an example of the display system using a touch panel 780. FIG. 14 shows a block diagram of the display system corresponding to FIG. 13.

The touch panel 780 in FIG. 13 and FIG. 14 includes a communication portion 781. The touch panel 780 in FIG. 13 and FIG. 14 is capable of transmitting and receiving data to and from arithmetic units 782A and 782B provided outside the touch panel 780.

The touch panel 780 includes the touch sensor 710, the driver IC 735, the control circuit 731, the communication portion 781, and the display portion 702.

The communication portion 781 has a function of transmitting data 784 to the external arithmetic unit 782A. The communication portion 781 has a function of receiving data 785 from the external arithmetic unit 782A.

Note that it is preferable that the communication portion 781 wirelessly transmit and receive the data 784 and the data 785 to and from the external arithmetic unit 782A. In the case of performing wireless communication, a wireless LAN conformable to a communication standard, such as Wireless Fidelity (Wi-Fi) (registered trademark), Bluetooth (registered trademark), or ZigBee (registered trademark), is used. As described above, wireless communication between the communication portion 781 and the external arithmetic unit 782A allows a user to comfortably use the touch panel 780.

The data 784 is generated in response to a command input to the touch panel. The data 785 is data that is read in response to the data 784.

The external arithmetic unit 782A is connected to a network 783 and is connected to the external arithmetic unit 782B via the network 783. Here, as each of the arithmetic units 782A and 782B, a tablet computer, a notebook computer, a desktop computer, a large-size computer such as a server system, a super computer, a smart phone, a portable phone, a game machine, or a device incorporated in a portable game machine or a portable information terminal can be used.

The external arithmetic unit 782A has a function of transmitting and receiving the data 784 and the data 785 to and from the communication portion 781 and also has a function of communicating with the arithmetic unit 782B via the network 783. As the external arithmetic unit 782A, for example, a device incorporated in a desktop computer is used.

The external arithmetic unit 782B has a function of supplying the data 785 in response to the data 784. In addition, the external arithmetic unit 782B has a function of communicating with the arithmetic unit 782A via the network 783. Thus, it is preferable that arithmetic unit 782B have larger storage capacity than the external arithmetic unit 782A. Accordingly, as the external arithmetic unit 782B, a device incorporated in a large-size computer such as a server system is preferably used.

As described above, with the display system in FIG. 13, in accordance with a command input to the touch panel 780, data can be acquired from the arithmetic unit 782B via the network 783. A computer (e.g., a server system) in which the arithmetic unit 782B is incorporated has a larger amount of computational resources than the touch panel 780. By utilizing cloud computing as described, various data can be handled in the touch panel 780.

FIG. 15 shows a flow chart illustrating the display system using the touch panel 780.

In Step S21, the command a input to the touch panel is recognized. For the touch panel and the command-input method, the configuration and the method described in the above embodiment are used.

When the touch sensor 710A senses the approach or contact of an object in the state where only the touch sensor 710A is enabled and the touch sensor 710B is not driven, operation for enabling the touch sensor 710B starts. After that, when the touch sensor 710B senses the touch, the touch panel 700 recognizes input of the command a and executes processing in response to the command a in Step S22, thereby generating data 784 in the control circuit 731.

In Step S23, the data (the data 784) generated in response to the command a is transmitted from the communication portion 781 to the external arithmetic unit 782A.

In Step S24, the data 784 is transmitted from the external arithmetic unit 782A to the external arithmetic unit 782B via the network 783.

In Step S25, the data (the data 785) generated in response to the data 784 is read out from the arithmetic unit 782B. The data 785 may be obtained by reading out the data stored in the arithmetic unit 782B; alternatively, the data 785 may be generated in the arithmetic unit 782B on the basis of the command of the data 784.

In Step S26, the data 785 is transmitted from the external arithmetic unit 782B to the external arithmetic unit 782A via the network 783.

In Step S27, the data 785 is transmitted from the external arithmetic unit 782A to the communication portion 781.

In Step S28, on the basis of the data 785 received by the communication portion 781, the Sig 748 and the Sig 749 that are predetermined signals are generated in the control circuit 731.

In Step S29, display data is generated on the basis of the Sig 748 and the Sig 749 and is output to the display portion 702. Specifically, the Sig 748 and the Sig 749 generated in Step S28 are output to the GD controller 732 and the data controller 734, respectively. The GD controller 732 generates the GCK 742 and the GSP 743 in response to the Sig 748. The GCK 742 is a clock signal, and is output to the GD 705 and the sensing circuits 736A and 736B. The GSP 743 is a start pulse signal, and is output to the GD 705. In addition, the data controller 734 generates the Video S744 in response to the Sig 749. The Video S744 is an image signal and is output to the SD 706.

As described above, in the structure shown in FIG. 13, FIG. 14, and FIG. 15, data can be transmitted and received to and from the arithmetic units with large capacity; thus, the housing 701 can be miniaturized and lightened. Consequently, a user can use the touch panel 780 more comfortably. Furthermore, the arithmetic unit 782A and the arithmetic unit 782B are not necessarily provided inside the touch panel 780; thus, power saving of the touch panel 780 can be achieved. Furthermore, cloud computing using the external arithmetic unit 782B operated at high speed enables display data to be displayed at a higher resolution and higher speed.

Although in FIG. 13, FIG. 14, and FIG. 15, the external arithmetic unit 782B is configured to perform arithmetic operation via the network 783 so that the data 785 is generated from the data 784, an electronic device described in this invention is not limited to this structure. For example, without using the arithmetic unit 782B, the arithmetic unit 782A may be configured to perform the arithmetic operation so that the data 785 is generated from the data 784.

Furthermore, although in FIG. 13, FIG. 14, and FIG. 15, the data 784 and the data 785 are transmitted and received to and from the external arithmetic unit 782B via the external arithmetic unit 782A, an electronic device described in this invention is not limited to this structure. For example, a structure may be employed in which the communication portion 781 is connected to the network 783 without passing the arithmetic unit 782A and transmission and reception of the data 784 and the data 785 are performed between the arithmetic unit 782B and the communication portion 781.

This embodiment can be implemented in appropriate combination with any of the structures described in the other embodiments and the like.

REFERENCE NUMERALS

700: touch panel, 701: housing, 702: display portion, 705: GD, 706: SD, 710: touch sensor, 710A: touch sensor, 710B: touch sensor, 721: operation button, 722: operation button, 723: clasp, 725A: band, 725B: band, 731: control circuit, 732: GD controller, 734: data controller, 735: driver IC, 736A: sensing circuit, 736B: sensing circuit, 737: determination circuit, 742: GCK, 743: GSP, 744: Video S, 747: IRQ, 748: Sig, 749: Sig, 750: touch panel, 760: touch sensor, 760A: touch sensor, 760B: touch sensor, 760C: touch sensor, 777: finger, 780: touch panel, 781: communication portion, 782A: arithmetic unit, 782B: arithmetic unit, 783: network, 784: data, 785: data This application is based on Japanese Patent Application serial no. 2015-239258 filed with Japan Patent Office on Dec. 8, 2015 and Japanese Patent Application serial no. 2016-010297 filed with Japan Patent Office on Jan. 22, 2016, the entire contents of which are hereby incorporated by reference.

The invention claimed is:

1. A command-input method of a touch panel including a first touch sensor and a second touch sensor, the method comprising the steps of:
   a first step of sensing an object by the first touch sensor;
   a second step of starting operation for enabling operation of the second touch sensor;
   a third step of sensing the object by the second touch sensor;
   a fourth step of executing a first command when the object is sensed in the third step;
   a fifth step of starting operation for disabling the operation of the second touch sensor; and
   a sixth step of proceeding to the fifth step when the object is not sensed in the third step,
   wherein in the second step, the operation for enabling the operation of the second touch sensor starts when the first touch sensor senses the object,
   wherein a first time interval is provided between the second step and the third step,
   wherein the first time interval is provided between the second step and the fifth step,
   wherein the first time interval is provided between the second step and the sixth step, and
   wherein the first time interval is greater than or equal to 0.05 seconds and less than or equal to 0.5 seconds.

2. A touch panel comprising:
   a display portion;
   a first touch sensor; and
   a second touch sensor configured to be disabled when a touch is not sensed by the second touch sensor within a time interval after sensing a touch by the first touch sensor,
   wherein the first touch sensor and the second touch sensor are spaced from each other, and
   wherein the first touch sensor and the second touch sensor are provided on the same plane.

3. The touch panel according to claim 2,
   wherein the first touch sensor and the second touch sensor are spaced from each other so that a user using a finger can surely apply selectively pressure to one of the first touch sensor and the second touch sensor.

4. The touch panel according to claim 2,
   wherein the first touch sensor has a region overlapping with the display portion, and
   wherein the second touch sensor has a region overlapping with the display portion.

5. A touch panel according to claim 2,
   wherein the display portion includes a display element, and
   wherein the display element is an EL element, a liquid crystal element, or an electrophoretic element.

6. The touch panel according to claim 2, further comprising a driver IC,
   wherein the driver IC includes a scan line driver circuit controller and a sensing circuit,
   wherein the display portion includes a scan line driver circuit, and
   wherein the scan line driver circuit controller outputs a clock signal to the sensing circuit and the scan line driver circuit.

7. A display system comprising:
   an electronic device; and
   an arithmetic unit,
   wherein the electronic device includes a display portion, a first touch sensor, a second touch sensor, and a communication portion,
   wherein the first touch sensor and the second touch sensor are spaced from each other,
   wherein the first touch sensor and the second touch sensor are provided on the same plane,
   wherein the first touch sensor and the second touch sensor are configured to sense a command,
   wherein the communication portion is configured to transmit first data in response to the command to the arithmetic unit,
   wherein the arithmetic unit is configured to output second data in response to the first data,
   wherein the arithmetic unit is configured to transmit the second data to the communication portion,
   wherein the display portion is configured to perform display in response to the second data, and
   wherein the second touch sensor is configured to be disabled when a touch is not sensed by the second touch sensor within a time interval after sensing a touch by the first touch sensor.

8. The display system according to claim 7,
   wherein the first touch sensor and the second touch sensor are spaced from each other so that a user using a finger can surely apply selectively pressure to one of the first touch sensor and the second touch sensor.

9. The display system according to claim 7,
   wherein the communication portion is configured to communicate with the arithmetic unit wirelessly.

10. A display system comprising:
    an electronic device;
    a first arithmetic unit; and
    a second arithmetic unit,
    wherein the electronic device includes a display portion, a first touch sensor, a second touch sensor, and a communication portion,
    wherein the first touch sensor and the second touch sensor are spaced from each other,
    wherein the first touch sensor and the second touch sensor are provided on the same plane,
    wherein the first touch sensor and the second touch sensor are configured to sense a command,
    wherein the communication portion is configured to transmit first data in response to the command to the first arithmetic unit,
    wherein the first arithmetic unit is configured to transmit the first data to the second arithmetic unit via a network,
    wherein the second arithmetic unit is configured to output second data in response to the first data,
    wherein the second arithmetic unit is configured to transmit the second data to the first arithmetic unit via the network,
    wherein the first arithmetic unit is configured to transmit the second data to the communication portion, and
    wherein the display portion is configured to perform display in response to the second data.

11. The display system according to claim 10,
    wherein the first touch sensor and the second touch sensor are spaced from each other so that a user using a finger can surely apply selectively pressure to one of the first touch sensor and the second touch sensor.

12. The display system according to claim 10,
    wherein the communication portion is configured to communicate with the first arithmetic unit wirelessly.

* * * * *